United States Patent
Wilson et al.

(10) Patent No.: US 7,652,261 B1
(45) Date of Patent: Jan. 26, 2010

(54) MULTICHANNEL NANOPARTICLE SCINTILLATION MICRODEVICE WITH INTEGRATED WAVEGUIDES FOR RADIATION DETECTION

(75) Inventors: Chester S. Wilson, Ruston, LA (US); Scott M. Pellegrin, Ruston, LA (US)

(73) Assignee: Louisiana Tech University Foundation, Inc., Ruston, LA (US)

( * ) Notice: Subject to any disclaimer, the term of this patent is extended or adjusted under 35 U.S.C. 154(b) by 228 days.

(21) Appl. No.: 11/336,103

(22) Filed: Jan. 20, 2006

(51) Int. Cl.
*G01T 1/20* (2006.01)
(52) U.S. Cl. .............................. 250/370.11; 250/370.12
(58) Field of Classification Search ............ 250/370.11, 250/370.12, 370.01; 252/301.4 R, 301.5
See application file for complete search history.

(56) References Cited

U.S. PATENT DOCUMENTS

| | | | |
|---|---|---|---|
| 3,652,855 A * | 3/1972 | McIntyre et al. ............ 250/366 |
| 6,909,098 B2 * | 6/2005 | Bross et al. ................. 250/367 |
| 6,927,397 B2 * | 8/2005 | Bross et al. ............ 250/390.11 |
| 7,038,211 B2 * | 5/2006 | Bross et al. ................. 250/368 |
| 7,067,079 B2 * | 6/2006 | Bross et al. ................. 264/122 |
| 7,166,849 B2 * | 1/2007 | Jiang et al. ............. 250/370.11 |
| 2002/0074929 A1 * | 6/2002 | Taskar et al. ................ 313/467 |
| 2002/0181647 A1 * | 12/2002 | Venkataramani et al. ...... 378/19 |
| 2003/0021374 A1 * | 1/2003 | Venkataramani et al. ...... 378/19 |
| 2004/0104347 A1 * | 6/2004 | Bross et al. ................. 250/367 |
| 2004/0104348 A1 * | 6/2004 | Bross et al. ................. 250/368 |
| 2004/0104356 A1 * | 6/2004 | Bross et al. ............. 250/486.1 |
| 2004/0104500 A1 * | 6/2004 | Bross et al. ................... 264/85 |
| 2006/0054863 A1 * | 3/2006 | Dai et al. .............. 252/301.4 R |

OTHER PUBLICATIONS

Ledoux G., Mercier B., Louis C., Dujardin C., Tillement O., Perriat P.; Synthesis and Optical Characterization of Gd2O3:Eu3+ nanocrystals: Surface States and VUV Excitation; 2004; Radiation Measurements; vol. 38; pp. 763-766.*
Waguespack R., Pellegrin S., Millet B., Wilson C. G.; Integrated System for Wireless Radiation Detection and Tracking; Apr. 20-21, 2007; IEEE Region 5 Technical Conference; pp. 29-31.*
Pellegrin S., Olivier J., Wilson C.G.; A Dual Layer Scintillation Microdevice for Gamma and Beta Particle Energy Spectroscopy; Jun. 10-14, 2007; Solid-State Sensors, Actuators and Microsystems Conference 2007; pp. 1111-1114.*
Pellegrin S., Whitney C., Wilson C.G.; A Multichannel Nanoparticle Scintillation Microdevice with Integrated Waveguides for Alpha, Beta, Gamma, X-Ray, and Neutron Detection; Jan. 22-26, 2006; MEMS 2006; pp. 682-685.*

(Continued)

*Primary Examiner*—David P Porta
*Assistant Examiner*—David S Baker
(74) *Attorney, Agent, or Firm*—Jones, Walker, Waechter, Poitevent, Carrere & Denegre, L.L.P.

(57) ABSTRACT

A device for detecting radiation includes a substantially transparent substrate with one or more substantially transparent scintillating films patterned onto the surface and with one or more integrated waveguides such that radiation of differing species may be detected by an optical light detector and such that the composition of the radiation may be analyzed. A scintillating material for detecting individual species of radiation and including one or more groups of nanoparticles mixed with a fast electron scintillating material and extruded into a transparent film such that a light pulse is emitted when said transparent film is exposed to the species of radiation targeted by the nanoparticle groups.

6 Claims, 10 Drawing Sheets

OTHER PUBLICATIONS

Whitney C., Pellegrin S., Wilson C.G.; A Charge Conversion Nanoparticle Enhanced Microgeiger for Alpha, Beta, Gamma, and Neutron Detection; Jan. 13-17, 2008; MEMS 2008; pp. 952-955.*

Nakayama M., Ando N., Miyoshi T., Hirai J., Nishimura H.; Scintillation from NaI Nanoparticles Formed in CsI:Na thin Films; Mar. 1, 2002; Japan Journal of Applied Physics; vol. 41, Part 2, No. 3A; pp. L263-L265.*

J.B. Birks, "The Theory and Practice of Scintillation Counting", Pergamon Press, Oxford, UK 1964, p. 96.

R. Chechik, A. Breskin, G.P. Guedes, D. Mormann, J.M. Maia, V. Dangendorf D. Vartsky, J.M.F. Dos Santos, J.F.C.A. Veloso, "Recent Investigations of Cascaded GEM and MHSP Detectos," IEEE Transactions on Nuclear Science, 2004, 2097-2103, vol. 51, No. 5.

R. Dasaka, S. Pellegrin, M. Kamavaram, C. Wilson, "Micormachined Scintillation Devices with Charge Conversion Nanoparticles for Neutron and Beta Particle Detection," Proceeding—MicorTAs 2005, 2005, 488-490.

G.F. Knoll, "Radiation Detection and Measurement", 2000, 3d ed., John Wiley & Sons, Inc., Danvers, MA, 240-241.

W. Price, "Nuclear Radiation Detection", 1964, 2d ed., Mc-Graw-Hill, New York, p. 163.

C. Wilson, C. Eun, Y. Gianchandani, "D-MicroGeiger: A Micorfabricated Beta-Particle Detector with Dual Cavaties for Energy Spectroscopy," IEEE MEMS 2005, 2005, 622-25.

J. Va'Ra, T. Sumiyoshi, "Single Electron Amplification in a 'Single-MCP+Micromegas+PADS' Detector," IEEE Transactions on Nuclear Science, 2004, 2262-2266, vol. 51, No. 5.

Y.T Viday, B.V. Grinyov, L.B. Zagarij, N.D. Zverev, V.V. Chernikov, V.A. Tarasov A.M. Kudin, "Research and Development of Cereamic Scintillators Applied to Alpha-particle Detection," IEEE Nuclear Science Symposium & Medical Imaging Conference, 1995, 762-763, 2.

* cited by examiner

MULTICHANNEL NANOPARTICLE SCINTILLATION MICRODEVICE WITH INTEGRATED WAVEGUIDES FOR RADIATION DETECTION

I. CROSS-REFERENCE TO RELATED APPLICATION

Not Applicable.

II. STATEMENT REGARDING FEDERALLY SPONSORED RESEARCH AND DEVELOPMENT

Not Applicable.

III. BACKGROUND OF INVENTION

A. Field of the Invention

The present invention relates to apparatuses for detection of radiation. More specifically, one embodiment of the present invention relates to a multichannel nanoparticle scintillation microdevice with integrated waveguides that is capable of detecting and discerning multiple types of penetrating radiation when used in combination with an optical light detector. Another embodiment of the present invention also relates to scintillating materials.

B. Description of Related Art

Fissionable weapons grade material emits a variety of ionizing radiation, including alpha, beta, gamma, X-ray and neutron radiation. Therefore, homeland security applications require a portable and/or clandestine field detector that is capable of detecting and discerning the composition of concealed nuclear material of many types and constituencies, including that nuclear material used in weapons. The detection of neutrons, gamma rays, and X-rays by such a portable and/or clandestine field detector is of significant utility, as those particles cannot be shielded as easily as alpha and beta particles.

Neutrons are commonly detected by $BF_3$ tubes, but these devices are relatively large, with approximate sizes in the tens of centimeters, and efficiency of $BF_3$ tubes is proportional to the physical dimensions of the tube (Westinghouse Nuclear Instruments Catalog (author unknown) 1959). In these tubes, neutrons interacting with $^{10}B$ release an alpha particle. The charged alpha particle ionizes the fill gas liberating free electrons that are attracted to the anode, producing a current. Apart from the bulky shape of the device, the gases inside are extremely toxic, and the energy of the incident radiation cannot be determined.

Gamma and X-rays, on the other hand, are commonly measured by gas electron multiplier (GEM) detectors (Bambynek, W. "On Selected Problems in the Field of Proportional Counters," *Nuclear Instruments and Methods*, 112, 103-110 (1973)). Within a GEM detector, a gamma ray ionizes gas particles inside of a housing, thus releasing electrons. An applied high electric field between a anode and cathode causes the electrons to increase in energy, which, in turn, increases electron velocity. Enough energy is supplied by this increase in velocity to ionize more gas atoms, which creates an avalanche cascade of electrons (Va'ra, J. and T. Sumiyoshi, "Single electron amplification in a 'single MCP+micromegas+PADS' detector," *IEEE Transactions on Nuclear Science*, (51) 5, 2262-2266 (2004)). Moreover, a voltage ranging from 500 to 3000 V is required to produce the high electric field and GEM detectors are only used to detect photon-based radiation (Chechik, R.; Breskin, A.; Guedes, G. P.; Mormann, D.; Maia, J. M.; Dangendorf, V.; Vartsky, D.; Dos Santos, J. M. F.; Veloso, J. F. C. A., "Recent Investigations of Cascaded GEM and MHSP Detectors," IEEE Transactions on Nuclear Science, (51) 5, 2097-2103 (2004)).

The Geiger counter is another traditional portable radiation detection instrument. Geiger counters and similar detectors contain a gas-filled tube that conducts electricity when a particle or photon of radiation briefly causes the gas to be conductive. The detection instrument amplifies this signal and displays it to the user, either as a current measurement or an audible click. Geiger counters and the like measure, by counting incidents only, alpha, beta, gamma and X-ray radiation. Accordingly, no analysis of the composition of a concealed material containing multiple radiation types is possible and neutrons are not counted, in any event. Moreover, the resulting device is large and bulky. A very small Micro Geiger counter has been reported, but this device measures only beta particles (Wilson, C.; Eun, C.; Gianchandani, Y., "D-MicroGeiger: A Microfabricated Beta-Particle Detector with Dual Cavities for Energy Spectroscopy," IEEE MEMS 2005, 622-625 (2005)).

Another popular detection instrument, the scintillation counter, uses a scintillator to convert beta particles (known as fast electrons) into optical pulses (Price, W., Nuclear Radiation Detection, 2d ed., Mc-Graw-Hill, New York (1964)). The scintillator consists of a transparent crystal, plastic, or an organic liquid that fluoresces when struck by ionizing radiation. An optical light detector, e.g., a photomultiplier tube or photodiode, then measures the light emanating from the scintillator by converting it to an electric current (Birks, J. B., The Theory and Practice of Scintillation Counting, Pergamon Press, Oxford, UK (1964)). Some scintillators have been adapted to measure alpha particles and others measure gamma particles, converting these species into pulses of light (Knoll, G. K., Radiation Detection and Measurement, 3d ed., John Wiley & Sons, Inc., Danvers, Mass. (2000); Petr, I.; Birks, J. B.; Adams, A. "The Composite directional gamma-ray scintillation detector," Nuclear Instruments and Methods, (92) 2, 285-293 (1972); Viday, Y. T.; Grinyov, B. V.; Zagarij, L. B.; Zverev, N. D.; Chernikov, V. V.; Tarasov, V. A.; Kudin, A. M., "Research and development of ceramic scintillators applied to alpha-particle detection," IEEE Nuclear Science Symposium & Medical Imaging Conference, 2, 762-63 (1995)). Article counting and quantification of the amplitude of the signal produced by the optical detector typically can be accomplished. Scintillation counters are widely used because they can attain good quantum efficiency despite being moderately inexpensive.

The most widely used scintillators include inorganic crystals, organic-based liquids and plastics. Inorganic scintillators have the highest light output and linearity, but tend to have relative slow response times. Organic scintillators are much faster, but have lower light output. Moreover, the high Z-value and high density of inorganic crystals are suited for gamma/X-ray spectroscopy, whereas organics tend to be better suited for the direct detection of beta and alpha particles. Plastic scintillators, solids consisting of a polymerized organic scintillator in solution, are useful due to easy shaping and fabrication, and come in a variety of standard sizes and shapes. Additionally, plastics are relatively inexpensive as compared to inorganic crystals. It is desirable to use plastic scintillators in small radiation detection devices like those in certain embodiments of the present invention because such plastics are easily extruded into a variety of shapes and sizes to be used in microdevices, yet remain substantially solid.

Because organic scintillators, including plastics, demonstrate no photopeak due to a low Z-value, those in the art have loaded such scintillators with high-Z elements to provide for some possibility of photoelectric conversion upon exposure to gamma/X-rays. The addition of such elements, however, may lead to lower light output and the achieved energy resolution may be inferior to that of inorganic crystal scintillators. It is thus desirable to achieve particle loading that remains transparent, uniformly thin, and easily patterned onto microdevices.

Further, transparent fast-electron plastic scintillating materials specifically tailored to provide optimized detection of neutrons, in addition to alpha particles, beta particles, and gamma and X-rays, are useful in microfabricated devices, particularly those used to detect fissionable weapons grade nuclear material. Gadolinium has the highest thermal neutron capture cross-section of any known element (255,000 barns) and is thus ideal for thermal neutron capture reactions. Previous efforts to utilize gadolinium to detect neutrons involved its use as a foil (see, e.g., U.S. Pat. No. 5,659,177) or macroscopic block (see, e.g., U.S. Pub. No. 2005/0105665; U.S. Pub. No. 2005/0127300, U.S. Pat. No. 5,057,692).

As will be further described below, doping an organic plastic scintillator with various charge conversion nanoparticles to create transparent novel scintillating materials allows for the microfabrication of devices that are capable of converting differing radiation species into electrons through independent physical mechanisms (see Pellegrin, S., Whitney, C., Wilson, C. "A Multichannel Nanoparticle Scintillation Device With Integrated Waveguides for Alpha, Beta, Gamma, X-ray and Neutron Detection," Proceedings, *IEEE MEMS* (2006), which is hereby incorporated in its entirety herein). Due to the flexible nature of the scintillator base, each tailored scintillator may be manufactured into a thin film and integrated into a translucent or transparent substrate to create a novel microdevice capable of detecting and discriminating all species of radiation emitting from fissionable weapons materials in an expedient and efficient manner, and at relatively low cost.

IV. BRIEF DESCRIPTION OF THE INVENTION

It is one object of the invention to provide a device for detecting radiation comprising a substantially transparent substrate, one or more substantially transparent films patterned onto one co-planar surface of said substantially transparent substrate, each said substantially transparent film comprising fast electron scintillating material and nanoparticles, and said nanoparticles having a diameter less than the scattering threshold of light; and one or more waveguides integrated into said substantially transparent substrate, each said waveguide corresponding to each said substantially transparent film.

It is another object of the invention to provide, in combination with one or more optical light detectors, a device for detecting radiation comprising a transparent substrate, one or more transparent films patterned onto one co-planar surface of said transparent substrate, said transparent films comprising fast electron scintillating materials and nanoparticles, with said nanoparticles having a diameter less than the scattering threshold of light, one or more fiber optic waveguides connecting said substrate to said one or more optical light detectors, one or more optical barriers within said transparent substrate such that each transparent film corresponds to one fiber optic waveguide without optical interference, and an opaque outer coating covering substantially all of said transparent substrate except for areas upon which said transparent films are patterned and except for areas from which fiber optic waveguides emerge from the transparent substrate.

It is yet another object of the invention to provide a scintillating material, comprising one or more groups of nanoparticles, said nanoparticles having a diameter less than the scattering threshold of light, mixed with a fast electron scintillating material and extruded into a transparent film such that a light pulse is emitted when said transparent film is exposed to radiation.

The above summary of the present invention is not intended to describe each illustrated embodiment or every possible implementation of the present invention. The figures and the detailed description which follow, however, do particularly exemplify these embodiments.

V. BRIEF DESCRIPTION OF THE DRAWINGS

FIGS. 6(*a*)-(*c*) are illustrations of three different physical mechanisms by which radiation is detected. FIG. 6(*d*) illustrates the conversion of electrons to light by the scintillator in each (a) through (c).

FIGS. 7(*a*)-(*f*) illustrate the process for fabricating a multichannel microdevice according to one embodiment of the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

VI. DETAILED DESCRIPTION OF INVENTION

Figure 1:
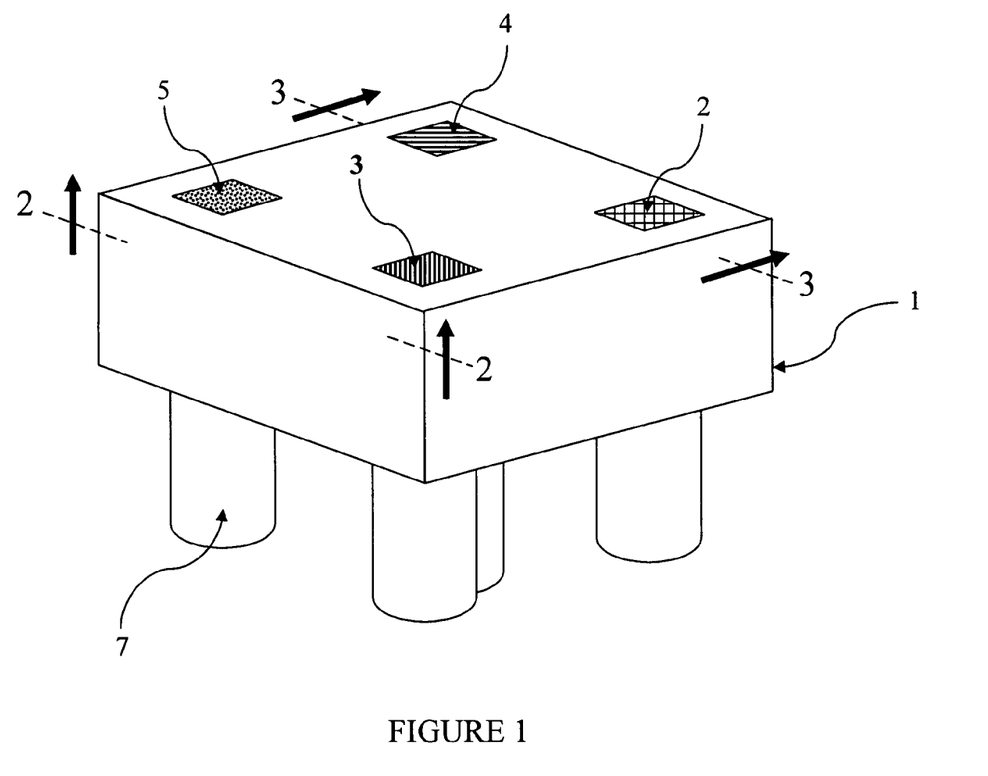
FIG. 1 is a perspective drawing of a multi-channel microdevice according to one embodiment of the invention.

An embodiment of the present invention is illustrated in FIG. 1 as a multi-channel nanoparticle scintillation microdevice with integrated waveguides for radiation detection (1). As will be further described below, the multichannel microdevice (1) comprises a powder-coated substantially transparent microstructure with integrated waveguides, fiber optic connections (7) and open wells for holding scintillating resins for radiation detection (2,3,4,5).

Figures 7, 7D, 7E, 7F:
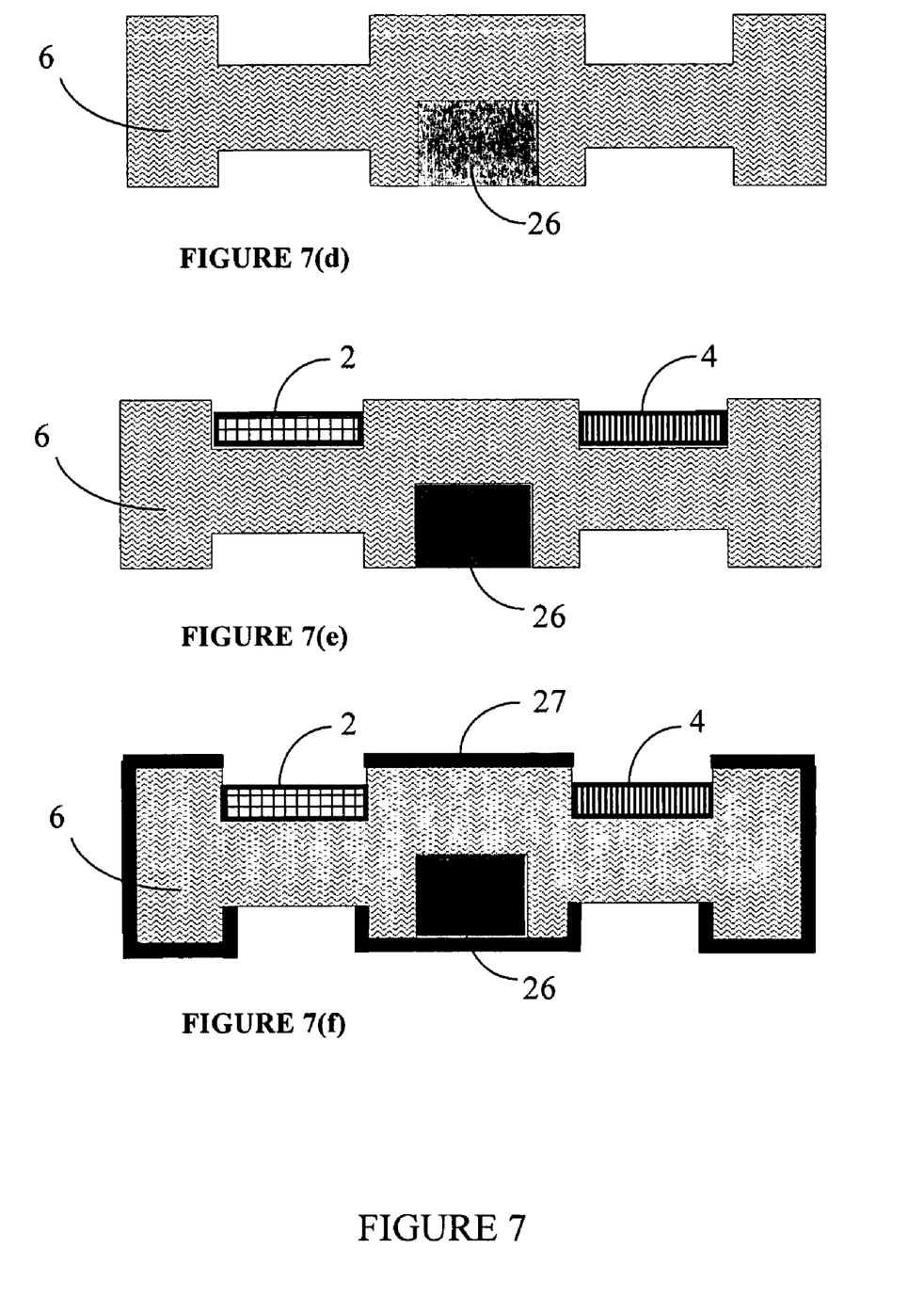
Figure 7A:
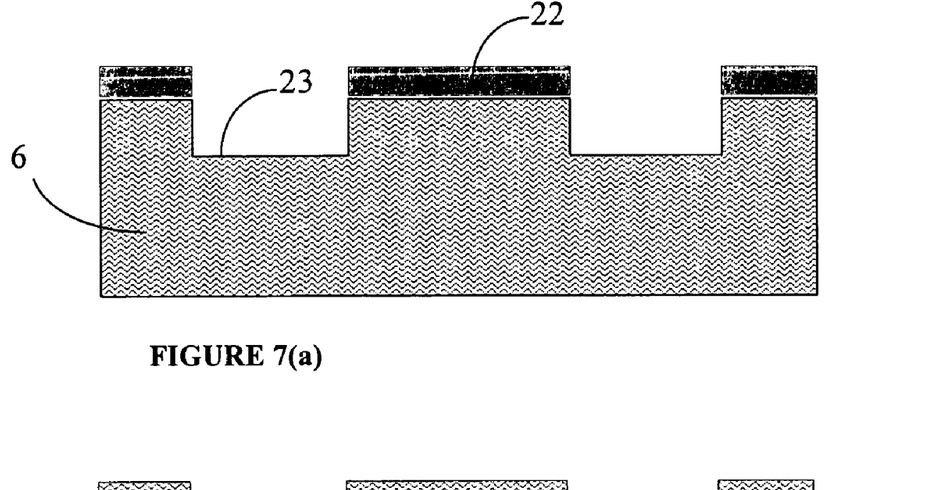
Figure 7B:
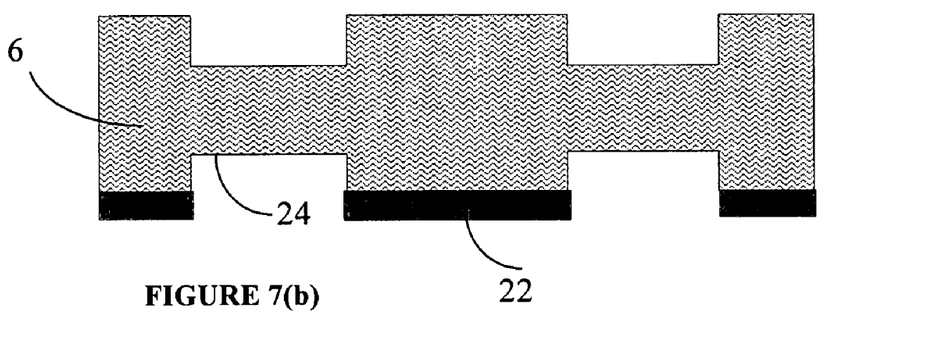
Figure 7C:
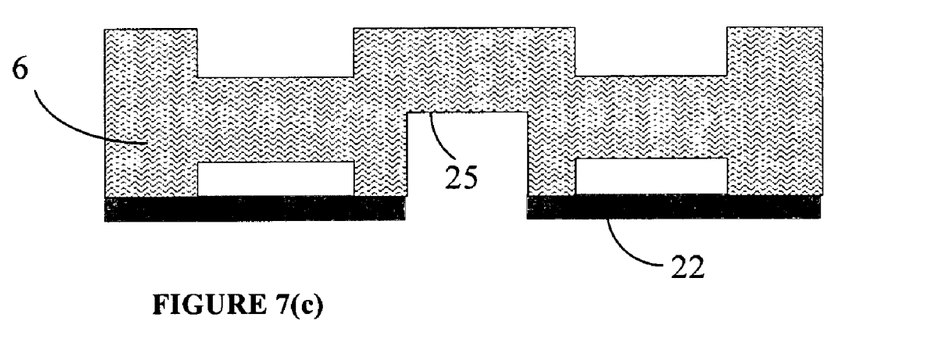

In this embodiment of the present invention, the microdevice (1) can be made from a sandblasted glass substrate (6) (see FIG. 7). The top side of the substrate (6) can be patterned with a polymer (22) and etched using a micro-sandblasting process to form glass cavities approximately 5 mm×5 mm×2 mm deep (23) (FIG. 7(*a*)). This micro-sandblasting process achieves etch rates of 1 mm per minute using <20 μm grit medium. To etch features onto the bottom of the glass substrate (6), a two etch process is employed; the cavities for optical barriers (25) are 4 mm deep, and the cavities for fiber optic connections (24) are 2 mm deep (see FIGS. 7(*b*) and 7(*c*)).

In the embodiment shown, the optical pulse produced in one channel is blocked from entering the waveguide of a different channel. Therefore, once etching is complete, opaque silicone rubber can be inserted into the optical barrier cavity (25) to create an optical barrier (26) (see FIG. 7(*d*)) to prevent or reduce cross-talk between the waveguides leading to each scintillating resin cavity (2,3,4,5) on the top surface of the substrate (6). By blocking rays from all but the relevant sensor for each channel, the device according to this embodiment can provide four separate channels, each sensitive to one species of radiation.

Figure 2:
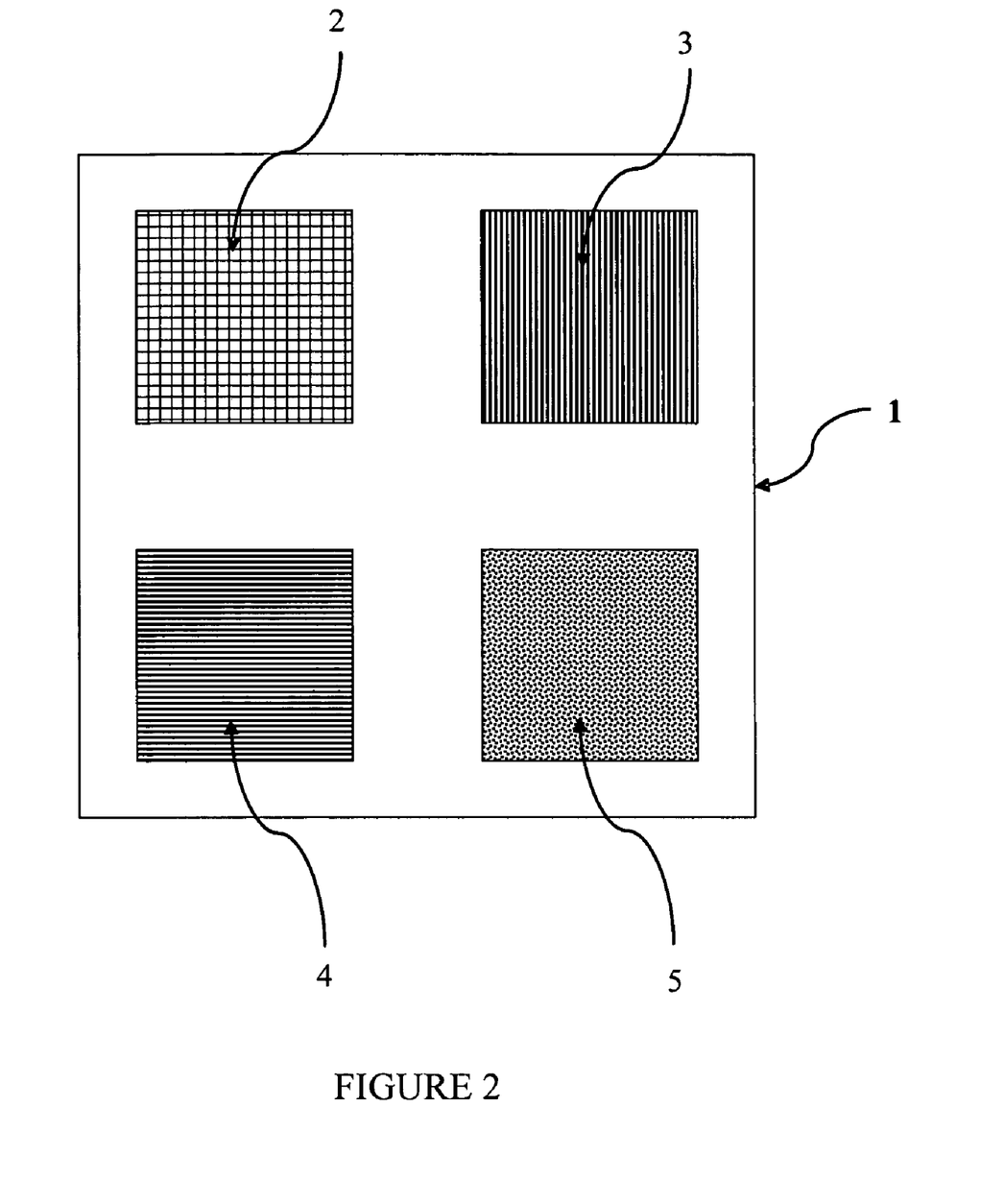
FIG. 2 illustrates the top-view of a microdevice according to one embodiment of the invention.
Figure 4:
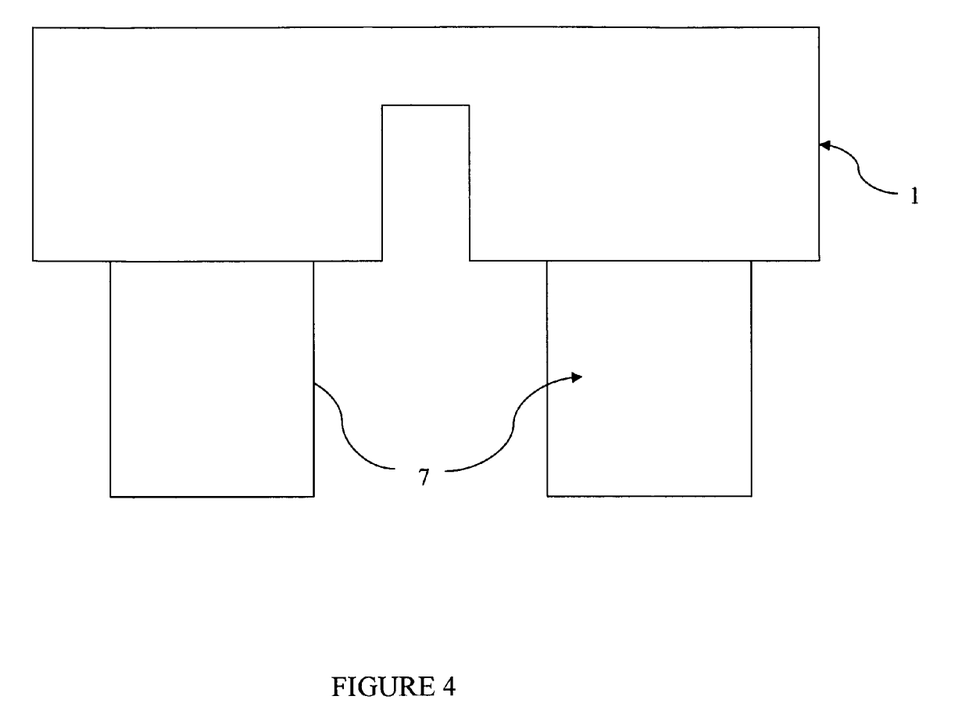
FIG. 4 is a side view illustration of a multi-channel microdevice according to one embodiment of the invention.
Figure 9:
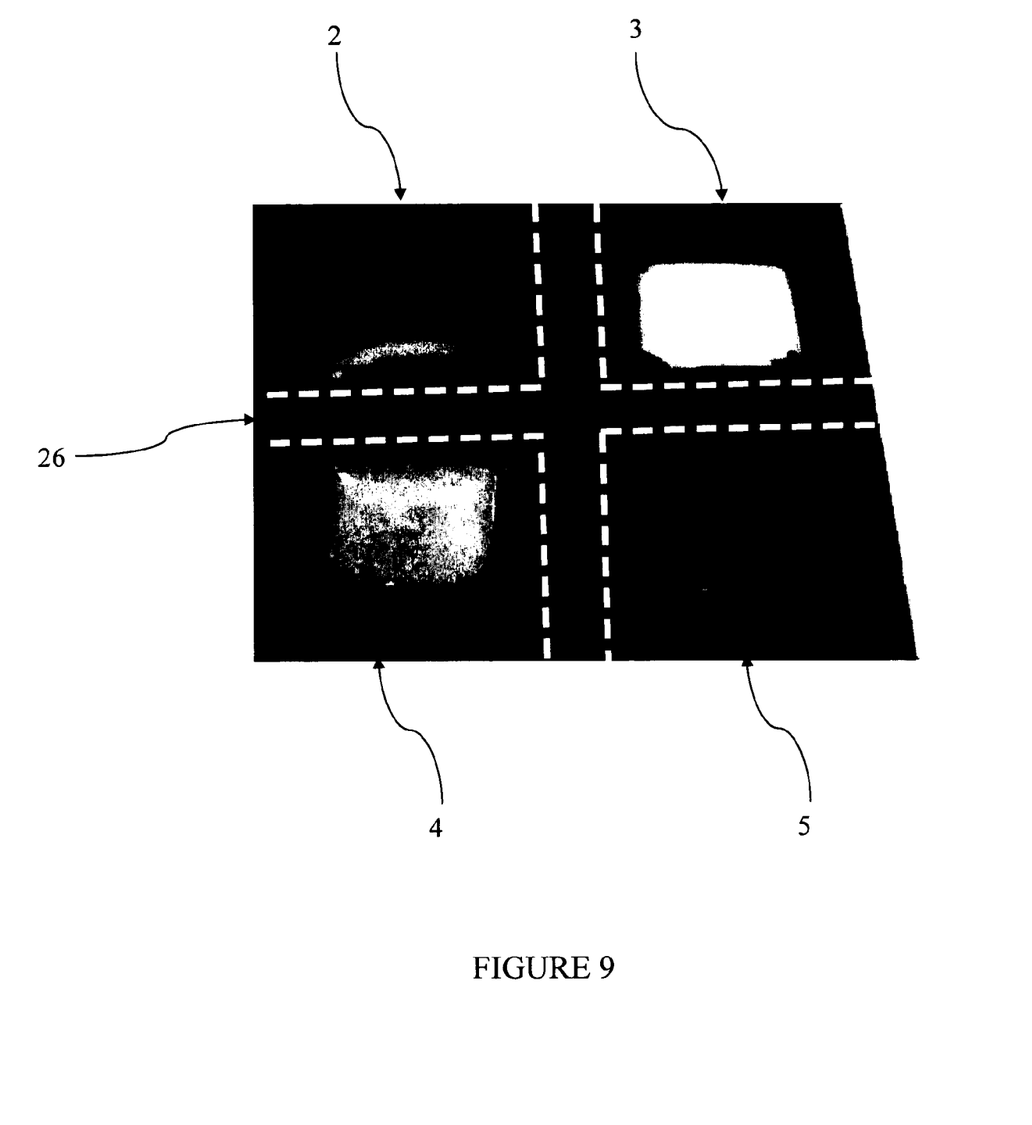
FIG. 9 is a top view photograph of a microdevice according to one embodiment of the invention wherein four channels are separated by an optical barrier.

Scintillating materials doped with nanoparticles (as described further below) (2,3,4,5) are then injected into the cavities (23) on the top side of the substrate (6), as shown in FIG. 7(*e*). Once the resins are in place, the substrate is powder-coated with carbon black paint (see FIG. 7(*f*)) and fiber optic waveguides (7) are inserted into their corresponding cavities (24). As suggested in FIG. 2, the spacing between each channel is 4 mm with a 2 mm border such that the microdevice according to this embodiment measures overall 1.8 cm×1.8 cm×0.06 cm. FIG. 4 illustrates a side-view of the powder-coated microdevice (1) with emerging fiber optic waveguides (7). FIG. 9 is a top view photograph of a microdevice (1) according to this embodiment which contains four channels. Alpha particle detector (2), neutron detector (3), Beta particle detector (4) and gamma/X-ray detector (5) are shown as injected into the cavities on the top of the substrate surface, which has been powder-coated. The optical crosstalk barrier (26) is highlighted in dashed lines. The schematic illustration of this top view is found in FIG. 2.

Figure 3:
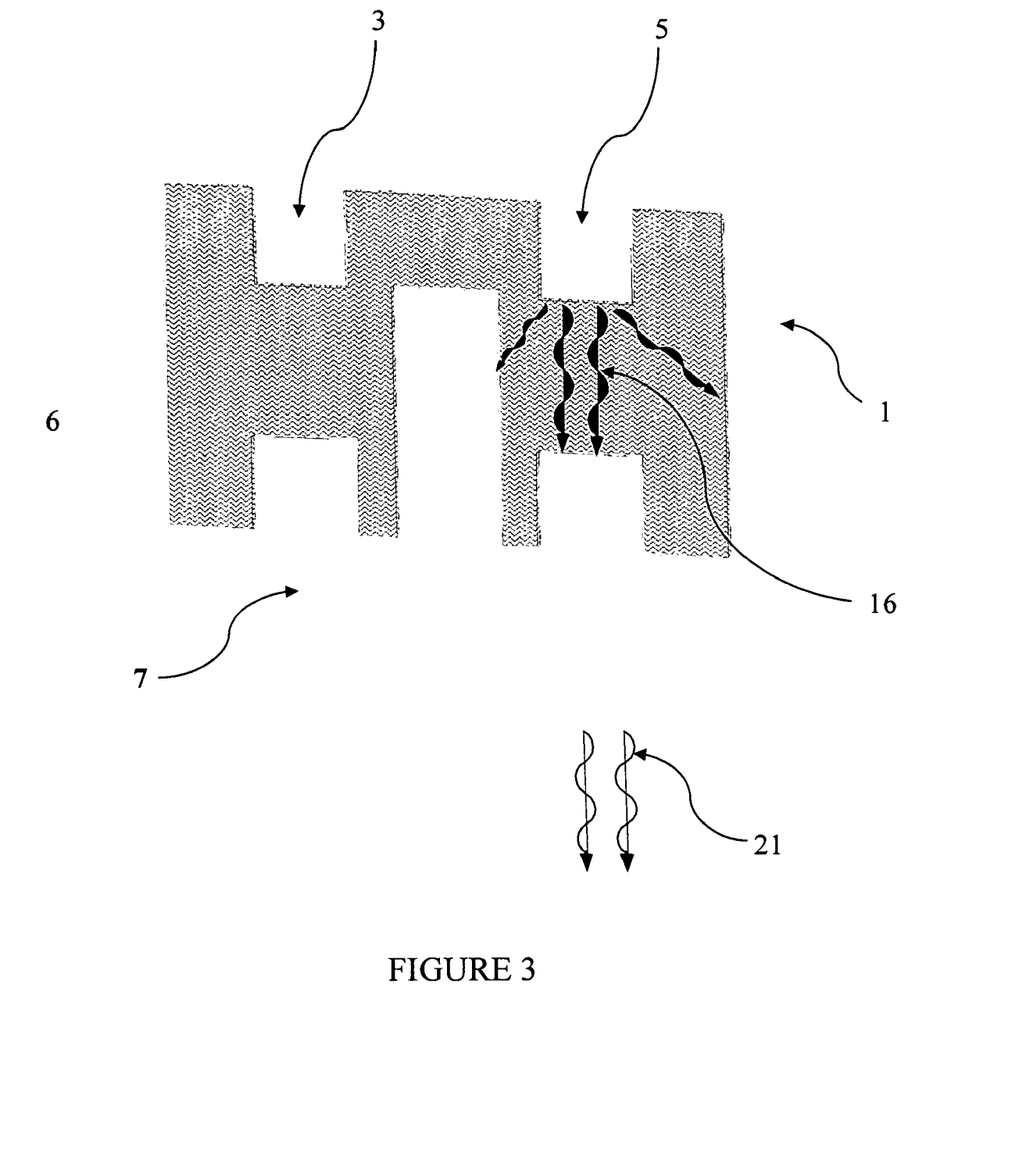
FIG. 3 is a cross-sectional illustration of a multi-channel microdevice according to one embodiment of the invention.

As shown in FIG. 3, in this embodiment, each fiber optic waveguide (7) leads from a quadrant associated with one scintillating resin (3 or 5) to create one channel. Direct light from each quadrant (16) is transmitted through fiber optic waveguides (7) and exits the microdevice (21). In the embodiment illustrated in FIG. 5, each fiber optic waveguide (7) is associated with one corresponding optical light detector (8). In another non-illustrated embodiment, all four fiber optic waveguides may be bundled to provide input simultaneously to one optical light detector. In yet another embodiment, also not illustrated, the transparent substrate may be machined to serve incorporate on-chip waveguides, allowing for direct connection to an optical light detector without use of separate fiber optic waveguide components.

Figure 5:
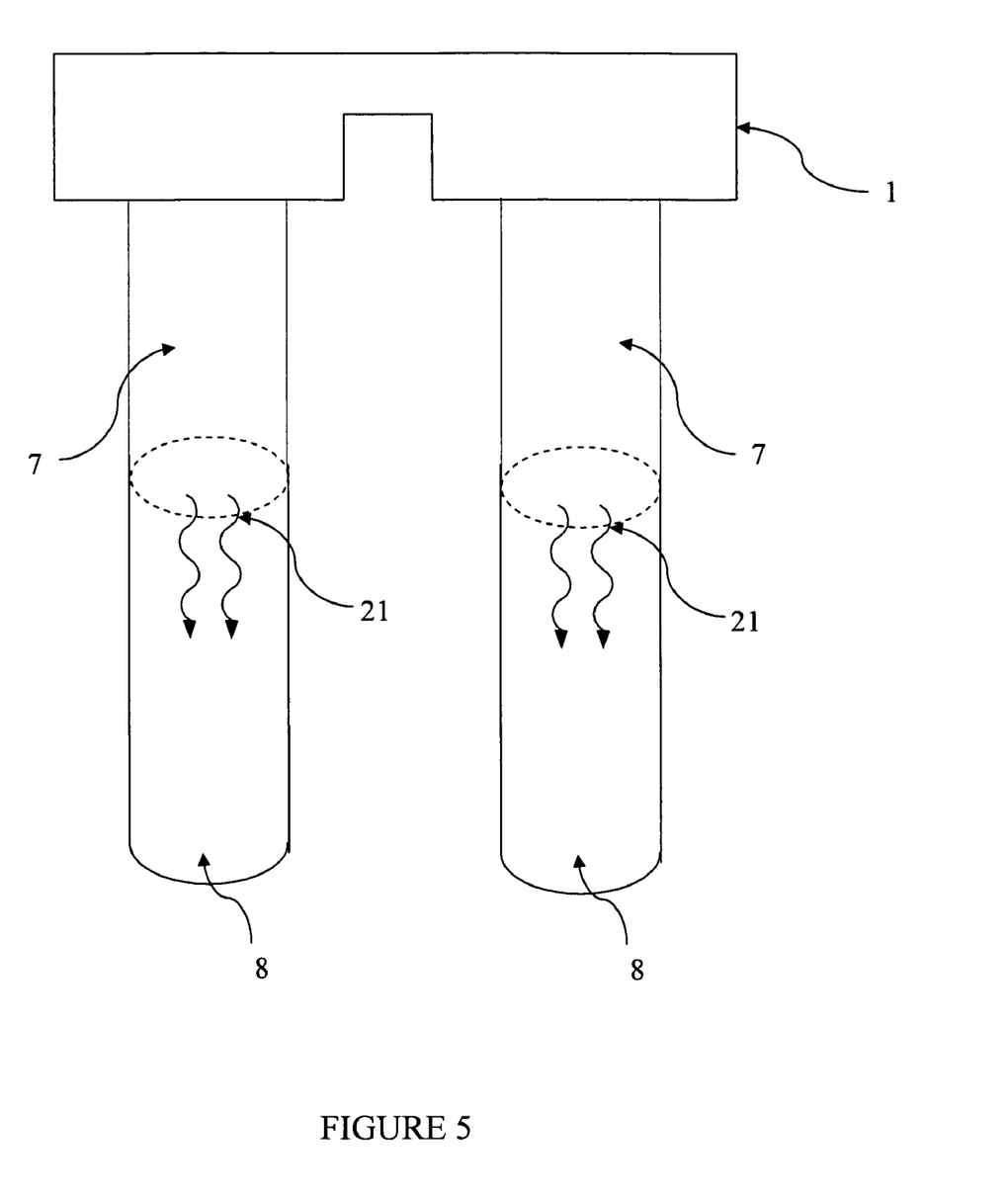
FIG. 5 is a side view illustration of a multi-channel microdevice according to one embodiment of the invention further illustrating photomultiplier tube connections.

The optical light detector (8) should have requisite semiconductors with depletion regions to provide direct conversion of radiation to electrical energy (for example, photomultiplier tubes, photodiodes, charge-coupled device (C.C.D.) arrays, etc.). As shown in FIG. 5, the optical light detector (8) receives light energy (21) from the fiber optic waveguides (7) emerging from each channel and converts that radiation (21) to electrical energy, which it then inputs to a connected device, controller or microprocessor with which pulse height spectroscopy or other analysis may be performed to determine the amount and type of radiation detected. Other methods may be used to determine the amount and types of radiation present, in connection with the output of the optical light detector. High pass and low pass filters and wavelength amplifiers may also be employed to enhance the utility of this invention. In this manner, all five species of radiation (using up to four channels, gammas and X-rays being detected by the same channel) may be detected on the same microdevice and the composition of the ambient radiation is measured and reported.

Although the present invention has been described in terms of specific embodiments, those skilled in the art will recognize other possible variations and modifications of the adduced principles and supporting concepts that come within the scope of the present invention. For example, the substrate may be any translucent material that provides for light propagation from the scintillating materials through the device to the waveguides. Although sandblasting is a useful technique for etching the substrate, any method of creating a patterned device may be used. Moreover, the optical barriers may be created in any manner such that cross-talk between the channels is prevented or reduced. Likewise, the effect of powder-coating to eliminate incident light may be created by other means known in the art to produce an opaque outer coating. It can be further appreciated that the scale of the device may vary with application.

It will also be apparent that there are innumerable types and combinations of nanoparticles and commercial scintillating resins, including those described below, which could be used in conjunction with the present invention. All such modifications of the present invention are intended to fall within the scope of the claims that follow.

A. Novel Nanoparticle Scintillating Materials

Figure 8:
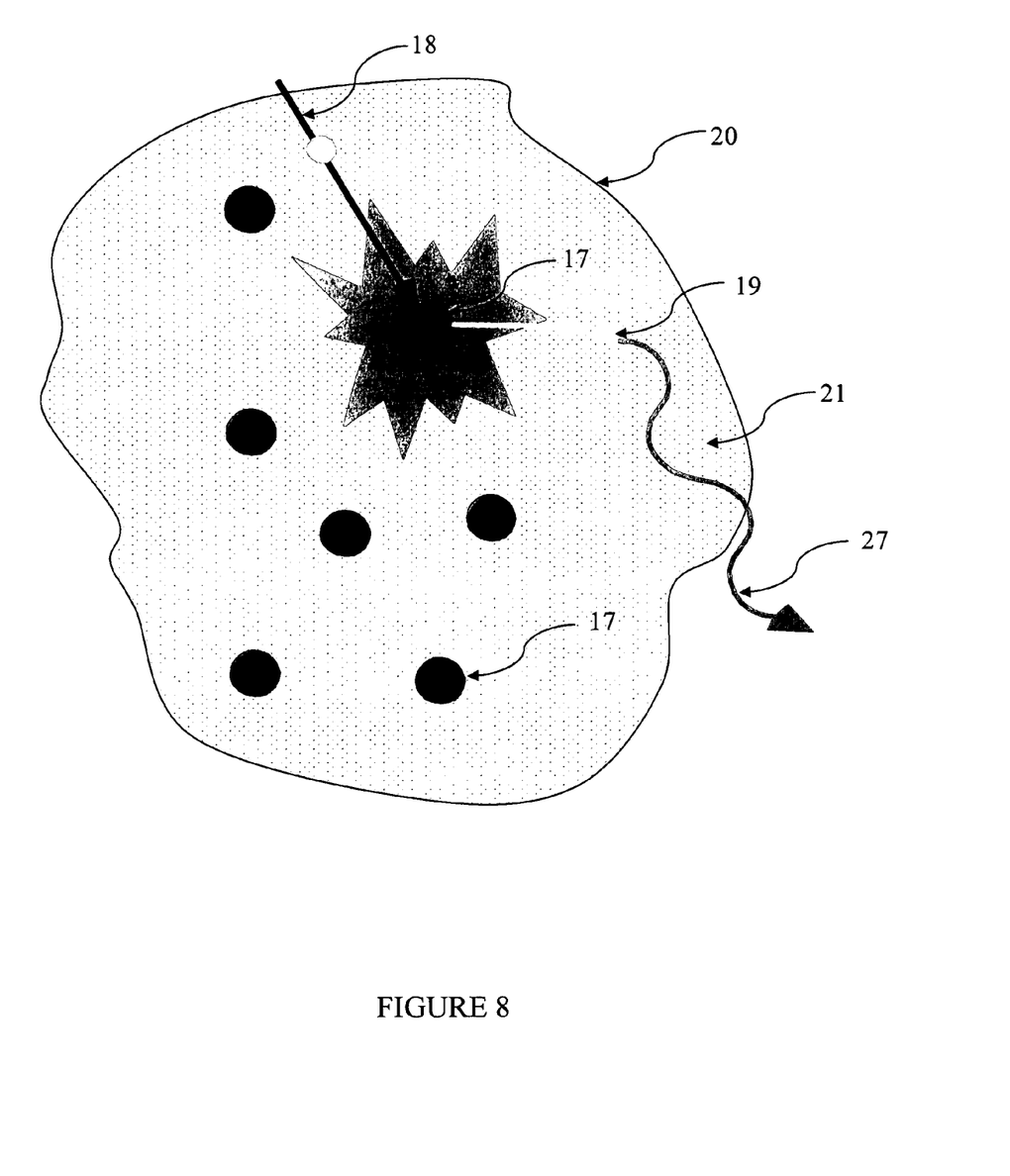
FIG. 8 illustrates the on-chip fusion reaction occurring as neutrons enter a scintillating material according to one embodiment of this invention.

Another embodiment of the present invention is a novel fast-electron scintillating material (20) as illustrated in FIG. 8. As will be further described below, the novel scintillating material is comprised of nanoparticles (17) suspended within a commercial scintillating material (21), such that when extruded into a transparent thin film, the novel scintillating material (20) generates a light pulse (27) upon exposure to radiation (18). Nanoparticles suspended within the fast-electron scintillating material should produce a sufficiently low scattered light intensity such that the detection of scintillation light from the microdevice is optimized and the scintillating material is substantially transparent. In some embodiments, nanoparticles may be sized from 10-8000 nanometers, such that the diameter of the nanoparticles is smaller than the threshold of scattered light.

Figure 6:
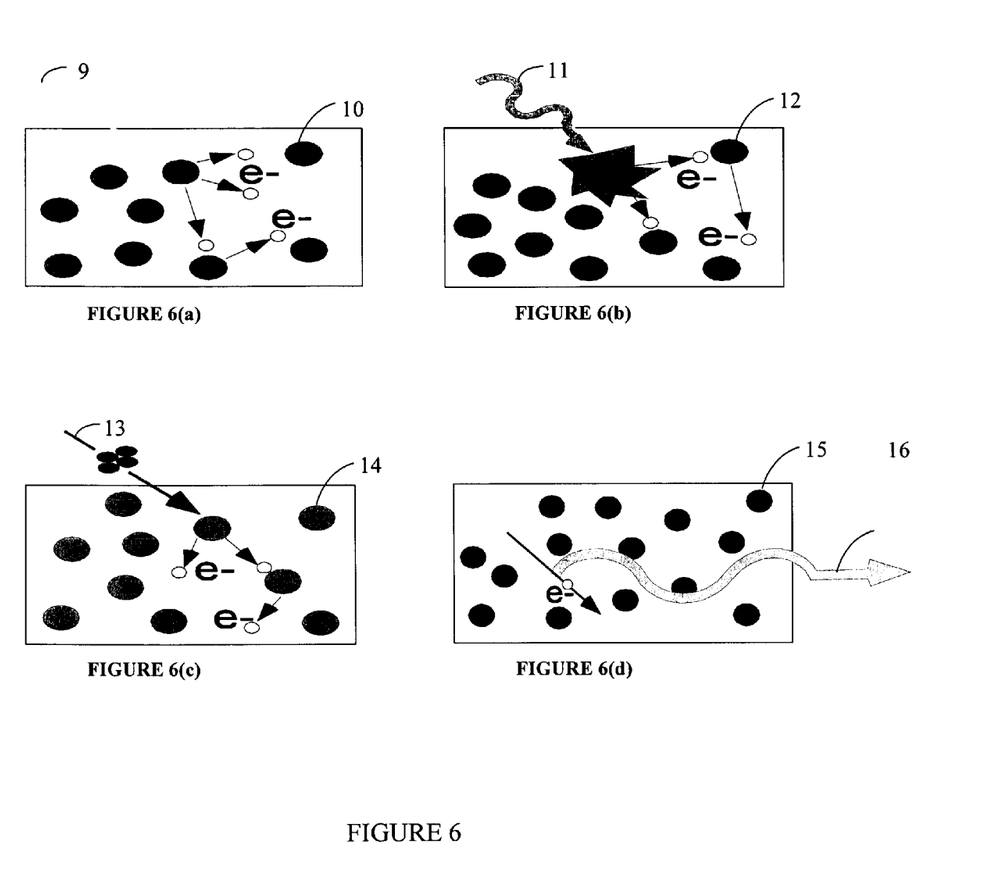

FIG. 8 describes generally an embodiment of the novel nanoparticle scintillation material using gadolinium oxide for neutron detection, but it is appreciated that FIGS. 6(*a*)-6(*d*) further describe other embodiments.

In a typical embodiment of this invention, existing, off-the-shelf fast electron scintillating resin (Bicron model BC490) at room temperature is mixed with nanoparticles, which are ball-milled from off-the-shelf larger particles, ranging in size between 10-8000 nm in diameter. The nanoparticles may be mixed with varying degrees of loading (e.g., 0-80% loading) to create more transparent resins for larger detectors or to create more compact models, as required by the user. The resin and nanoparticles may be mixed by simple shaking or other more sophisticated mixing techniques may be utilized. Once sufficiently mixed, the liquid doped resin is extruded into a thin film by using a concatenated spin coating process. Other extrusion techniques that produce thin films may be used.

1. Neutron Detection

In one embodiment of this invention, gadolinium oxide nanoparticles are loaded into a commercial fast-electron scintillating resin. Gadolinium has the highest thermal neutron absorption cross section of any material (~255,000 barns) and provides excellent results when nanoparticles containing gadolinium are mixed into fast-electron scintillating resins. Scintillation upon the absorption of neutrons occurs through an on-chip fusion reaction.

The on-chip fusion reaction is graphically illustrated in FIG. 8. In this embodiment, when exposed to neutrons (18), the embedded gadolinium oxide ($Gd_2O_3$) nanoparticles (17) within the scintillating resin (21) emit electrons (19). Minimal electron attenuation takes place in the nanoparticle because of its small size. These electrons (19) then scintillate the surrounding matrix (21) and light (27) is emitted from the novel scintillating material.

In another embodiment, additional metal oxide nanoparticles, with high secondary emission coefficients, e.g. tungsten oxide, chrome oxide and the like, in addition to charge conversion nanoparticles of gadolinium oxide, may be added to down-convert fast electrons emitted by the gadolinium oxide nanoparticles into more numerous and less energetic electrons, further confining electrons in the scintillating matrix. This addition of metal oxide nanoparticles allows slow electrons to be more easily adsorbed into the scintillators, minimizing particle leakage and increasing the efficiency of the scintillator.

2. Alpha Particle Detection

For alpha particle detection using an embodiment of the present invention, glass nanoparticles may be mixed with commercial off-the-shelf fast electron scintillating resin. The glass particles may be made by ball-milling off-the-shelf crown glass. As shown in FIG. 6(*c*), the glass particles (14) emit electron cascades through energy conversion due to coulombic forces between the alpha particle (13) and the valence electrons. When the amount of energy transferred from the alpha particle (13) to an electron is enough to strip the valence electron, the electron scintillates the resin, as shown generally in FIG. 6(*d*), and light (16) is emitted.

3. Beta Particle Detection

For beta particle detection using an embodiment of the present invention, off-the-shelf tungsten oxide nanoparticles (e.g., Alpha Chemical 2-500 nm mix) may be mixed with commercial off-the-shelf fast electron scintillating resin to enhance beta particle detection of the scintillator. As shown in FIG. 6(*a*), the tungsten oxide nanoparticles (10) cause the beta particles (9) to release several secondary electrons with lower energies. The beta particles (9) (also known as fast electrons) in conjunction with the secondary emission of electrons produce scintillation within the matrix and light is emitted (16), as shown generally in FIG. 6(*d*).

4. Gamma/X-Ray Detection

For gamma and X-ray detection using an embodiment of the present invention, lead oxide nanoparticles (e.g., Alpha Chemical 2-500 nm mix) may be mixed with commercial off-the-shelf fast electron scintillating resin. As shown in FIG. 6(*b*), the lead oxide nanoparticles (12) release photoelectrons upon absorption or scattering of gamma/X-rays (11). These photoelectrons are converted to light (16) by the scintillating matrix, as shown generally in FIG. 6(*d*).

We claim:

1. In combination with one or more optical light detectors, a device for detecting radiation comprising:
   a) a substantially transparent substrate;
   b) four or more substantially transparent films patterned onto one co-planar surface of said substantially transparent substrate, each said substantially transparent film comprising fast electron scintillating material and nanoparticles, and said nanoparticles having a diameter less than the scattering threshold of light;
   c) one or more fiber optic waveguides, each said fiber optic waveguide corresponding to a substantially transparent film;
   d) one or more optical barriers within said transparent substrate such that each transparent film corresponds to one fiber optic waveguide without substantial optical interference;
   e) a substantially opaque outer coating covering substantially all of said transparent substrate except for areas upon which said transparent films are patterned and except for areas from which fiber optic waveguides emerge from the transparent substrate; and
   f) wherein one said substantially transparent film contains nanoparticles comprising gadolinium oxide, a second said substantially transparent film contains nanoparticles comprising tungsten oxide, a third said substantially transparent film contains nanoparticles comprising lead oxide, and a fourth said substantially transparent film contains nanoparticles comprising glass.

2. The device according to claim 1 wherein at least one said substantially transparent film contains nanoparticles comprising two or more metal oxides.

3. A device for detecting radiation comprising:
   a) a substantially transparent substrate;
   b) four or more substantially transparent films patterned onto one co-planar surface of said substantially transparent substrate, each said substantially transparent film comprising fast electron scintillating material and nanoparticles, and said nanoparticles having a diameter less than the scattering threshold of light; and
   c) one or more waveguides integrated into said substantially transparent substrate, each said waveguide corresponding to a substantially transparent film; and
   d) wherein a first substantially transparent film including nanoparticles comprising gadolinium oxide, a second substantially transparent film including nanoparticles comprising tungsten oxide, a third substantially transparent film including nanoparticles comprising lead oxide, and a fourth substantially transparent film including nanoparticles comprising glass.

4. The device according to claim 3 further comprising one or more optical light detectors.

5. The device according to claim 3 wherein said substantial transparent film is designed to detect at least one type of radiation from the group consisting of neutrons, alpha particles, and beta particles.

6. The device according to claim 4 wherein a substantially opaque outer coating covers substantially all of said transparent substrate except for areas upon which said one or more transparent films are patterned and except for areas from which one or more fiber optic waveguides emerge from the transparent substrate.

* * * * *